(12) United States Patent
O'Sullivan et al.

(10) Patent No.: US 8,099,660 B1
(45) Date of Patent: Jan. 17, 2012

(54) TOOL FOR MANAGING ONLINE CONTENT

(75) Inventors: Joseph K. O'Sullivan, San Francisco, CA (US); Cathy Gordon, Cupertino, CA (US)

(73) Assignee: Google Inc., Mountain View, CA (US)

( * ) Notice: Subject to any disclaimer, the term of this patent is extended or adjusted under 35 U.S.C. 154(b) by 204 days.

(21) Appl. No.: 10/954,008

(22) Filed: Sep. 30, 2004

(51) Int. Cl.
*G06F 17/00* (2006.01)

(52) U.S. Cl. ........ 715/200; 715/201; 715/273; 715/277; 715/741; 715/234; 715/255

(58) Field of Classification Search .................. 715/500, 715/500.1, 526, 741, 200, 201, 273, 277, 715/234, 255
See application file for complete search history.

(56) References Cited

U.S. PATENT DOCUMENTS

| | | | |
|---|---|---|---|
| 5,864,871 A * | 1/1999 | Kitain et al. ............... | 707/104.1 |
| 5,978,818 A * | 11/1999 | Lin .............................. | 715/209 |
| 5,987,457 A * | 11/1999 | Ballard ............................. | 707/5 |
| 6,012,072 A * | 1/2000 | Lucas et al. .................... | 715/526 |
| 6,138,119 A | 10/2000 | Hall et al. | |
| 6,308,273 B1 * | 10/2001 | Goertzel et al. .................. | 726/9 |
| 6,314,425 B1 * | 11/2001 | Serbinis et al. ................. | 707/10 |
| 6,339,825 B2 * | 1/2002 | Pensak et al. ................. | 713/158 |
| 6,599,324 B2 * | 7/2003 | Saito et al. ..................... | 715/513 |
| 6,763,362 B2 * | 7/2004 | McKeeth ................... | 707/104.1 |
| 6,957,390 B2 * | 10/2005 | Tamir et al. ................... | 715/744 |
| 2001/0005855 A1 * | 6/2001 | Shaw et al. .................... | 709/206 |
| 2001/0007980 A1 * | 7/2001 | Ishibashi et al. ................ | 705/26 |
| 2001/0042049 A1 * | 11/2001 | Zucker et al. ................... | 705/55 |
| 2002/0035697 A1 * | 3/2002 | McCurdy et al. ............. | 713/200 |
| 2003/0009495 A1 * | 1/2003 | Adjaoute ................... | 707/501.1 |
| 2005/0004951 A1 * | 1/2005 | Ciaramitaro et al. ...... | 707/104.1 |
| 2005/0055271 A1 * | 3/2005 | Axe et al. ......................... | 705/14 |
| 2005/0063612 A1 * | 3/2005 | Manber et al. ................ | 382/305 |

* cited by examiner

*Primary Examiner* — Cesar Paula
*Assistant Examiner* — David Faber
(74) *Attorney, Agent, or Firm* — Harrity & Harrity, LLP

(57) ABSTRACT

A content management tool can assist publishers/authors in managing access rights and other parameters related to the display of documents online. The documents may include books and other documents that are traditionally published as printed works. The content management tool may display presentation parameters for the documents that relate to how the documents are to be shown to users when accessing the documents. The content management tool receives modifications to the presentation parameters and applies the modified versions of the presentation parameters to future accesses of the documents by users. The content management tool can, for example, be used to modify the portions of the document available for display, turn on/off certain portions of the document, manage links displayed concurrently with the document, and/or manage advertising related to the document.

26 Claims, 10 Drawing Sheets

|  | BOOK1 | BOOK2 | ... |
|---|---|---|---|
| 610 — % OF WORK TO DISPLAY | 10% | 5% | |
| 615 — PAGES TO BLOCK | 10-15, 50 | 30-200 | |
| 620 — IMAGES VIEWABLE? | YES | NO | |
| 625 — ADS SERVED? | NO | YES | |
| 630 — SPECIAL LINKS | NONE | WWW.ABOUT-BOOK2.COM | |
| 635 — BLOCKED AD URLS/ KEYWORDS | NONE | NONE | |
| 640 — AVG PAGES VIEWED PER USER | 6 | 8 | |
| 645 — MICROPURCHASE INFO | ALL CHAPTERS | N/A | |
| 650 — HITS FROM SEARCH QUERIES | 102 (80%) | 300 (70%) | |
| 655 — ADVERTISING STATS | AD REVENUE = $200 | AD REVENUE = $260 | |

SELECT: ☐ —660    SELECT: ☐ —660

670 — (EDIT SELECTED)

TOOL FOR MANAGING ONLINE CONTENT

BACKGROUND

A. Field of the Invention

Systems and methods described herein relate to document presentation and management and, more particularly, to the presentation of documents online.

B. Description of Related Art

Modern computer networks, and in particular, the Internet, have made large bodies of information widely and easily available. Free Internet search engines, for instance, index many millions of web documents that are linked to the Internet. A user connected to the Internet can enter a simple search query to quickly locate web documents relevant to the search query.

One category of content that is not widely available on the Internet, however, are the more traditional printed works of authorship, such as books and magazines. One impediment to making such works digitally available is that it can be difficult to convert printed versions of the works to digital form. Another impediment to making such works digitally available is that such works tend to be of relatively high individual value and tend to be more permanent creations than much of the content that is freely available on the Internet. A two-hundred page book, for instance, is likely to have taken significant time to research and write. The author may understandably not desire to make the book freely available, although the author may desire to allow some restricted access to the book, such as for marketing purposes.

One solution to the problem of not giving away the content of a document, such as a book, while still using the ubiquity and convenience of the Internet to publicize the document, involves giving readers limited access rights to the document. Numerous ways to limit access rights to a document are known. For example, only a limited portion of the document (e.g., no more than 5% of the entire document) may be shown to a reader.

In the situation where a content provider provides access to numerous documents from a number of authors/publishers, the different authors/publishers may desire to enforce a different limited set of access rights for their different documents.

SUMMARY

In one aspect, a method includes storing presentation parameters for the documents that relate to how the one or more documents are to be shown to users when accessing the documents. The method further includes receiving modifications to the presentation parameters and applying the modified versions of the presentation parameters to future accesses of the documents by users.

In another aspect, a system includes a content provider to provide access to documents associated with different publishers. The content provider provides the documents when requested by users. Further, the system includes a content management tool that provides an automated interface through which the publishers can modify access limitations imposed on the users when accessing the documents through the content provider.

In yet another aspect, a method includes receiving a request to access a document from a user and providing one or more pages of the document to the user pursuant to access parameters associated with the document. The access parameters are modifiable on a per-document basis by a publisher associated with the document.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 6 is an exemplary graphical interface that displays selected documents along with information relating to the documents;

DETAILED DESCRIPTION

The following detailed description of the invention refers to the accompanying drawings. The detailed description does not limit the invention.

Overview

Figure 1:
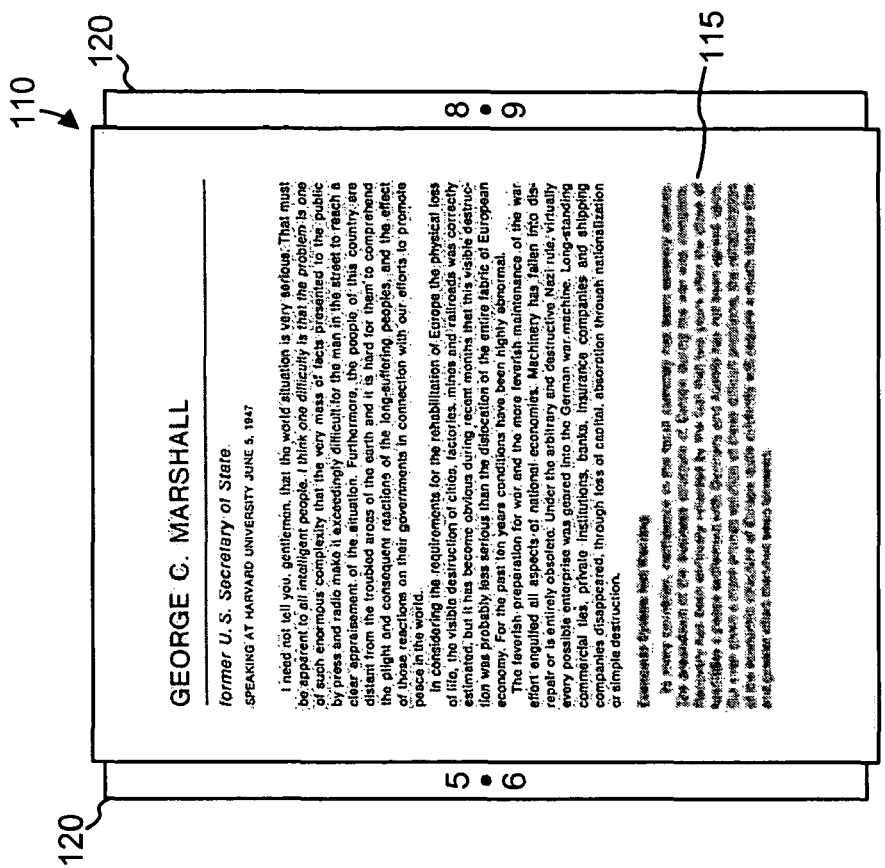
FIG. 1 is a diagram illustrating an example of access limitations imposed on a page of a book by an online content provider.

Document copyright owners, such as publishers or authors, may grant limited access rights to their documents. FIG. 1 is a diagram illustrating an example of access limitations imposed on a page of a book by an online content provider. An image of page 110 of a book may be shown to the user by an online content provider. Page 110 may be shown with graphical page turning elements 120. Only a portion of page 110, however, is shown to the user in a fully readable format. In this example, text 115, near the bottom of page 110, is blurred. The blurring may be performed by the content provider to intentionally limit access to the book.

Consistent with aspects of the invention, a content management tool can assist publishers/authors in managing access rights and other content related parameters. The management can be performed on a real-time or near real-time basis. The content management tool can, for example, be used to modify the portions of the document available for display, turn on/off certain portions of the document, manage links displayed concurrently with the document, and manage advertising related to the document.

Exemplary System Overview

Figure 2:
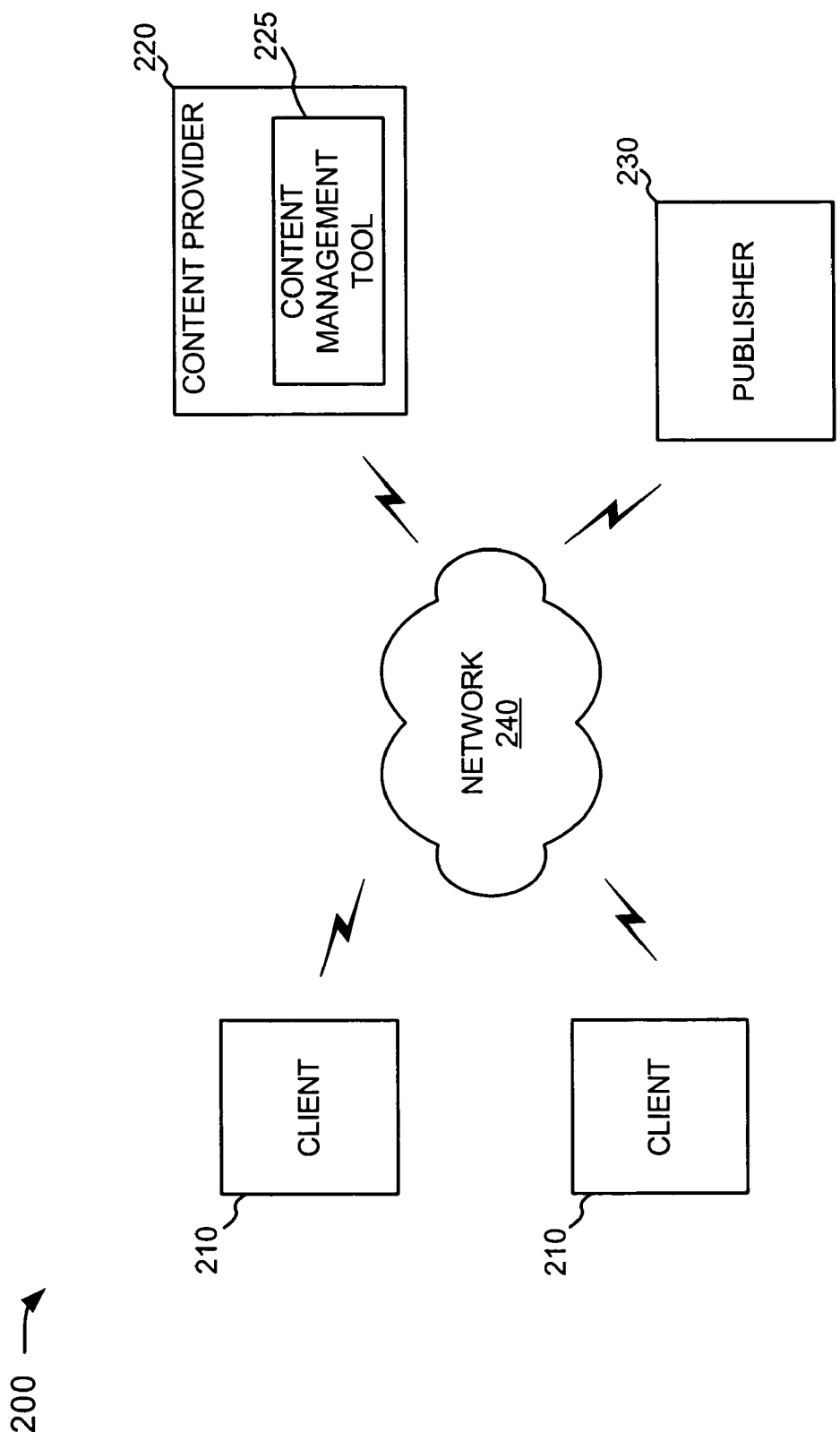
FIG. 2 is an exemplary diagram of a system in which concepts consistent with the principles of the invention may be implemented.

FIG. 2 is an exemplary diagram of a system 200 in which concepts consistent with the principles of the invention may be implemented. System 200 may include multiple clients 210 connected to a network 240. Network 240 may include a local area network (LAN), a wide area network (WAN), a telephone network, such as the Public Switched Telephone Network (PSTN), an intranet, the Internet, or a combination of networks. A content provider 220 and a publisher 230 may also connect to network 240. Content provider 220 and publisher 230 may include client computers and/or server computers.

Content provider 220 may generally represent an entity that provides content to users of clients 210. For example, content provider 220 may provide access to printed documents, such as books, catalogs, and magazines, to clients 210. In one implementation, the documents may be scanned-in and presented to clients 210 as images of the pages of the documents. The content may be associated with additional content related information, such as by categorizing the content by publisher, genre, identification number, etc. In some implementations, the content provided by content provider 220 may not be physically stored by content provider 220. Instead, the content may be stored by other computing devices connected to network 240 or another network, and content provider 220 may transmit links of the content to users of clients 210.

Publisher 230 may represent an entity with an ownership interest in one or more of the documents provided by content provider 220. Although this entity will be referred to as publisher 230 herein, publisher 230 may more generally represent any entity that has authority to modify access rights associated with at least one of the documents provided by content provider 220. The entity may be a publisher, author, other copyright owner, or agent of the publisher, author, or copyright owner. Publisher 230 would typically be the entity tasked with managing or overseeing one or more of the documents provided by content provider 220.

Two clients 210, one content provider 220, and one publisher 230 are illustrated as connected to network 240 for simplicity. More generally, there will typically be numerous clients 210 and publishers 230 that connect to a content provider 220. Each publisher 230 may manage their portion of the content provided by content provider 220.

Client 210 and publisher 230 may each include a device such as a wireless telephone, a personal computer, a personal digital assistant (PDA), a lap top, or another type of computation or communication device, a thread or process running on one of these devices, and/or an object executable by one of these devices. Content provider 220 may include a server device that processes, searches, and/or maintains documents and images in a manner consistent with the principles of the invention. Clients 210, content provider 220, and publisher 230 may connect to network 240 via wired, wireless, or optical connections.

In one implementation, content provider 220 may include a content management tool 225 that assists publisher 230 in managing their documents that are provided by content provider 220. Although shown as being implemented at content provider 220, content management tool 225 may, in some implementations, also be implemented at publisher 230. For example, content management tool 225 may include a server component that executes at content provider 220 and/or a client component that executes at publisher 230.

Exemplary Computing Device Architecture

Figure 3:
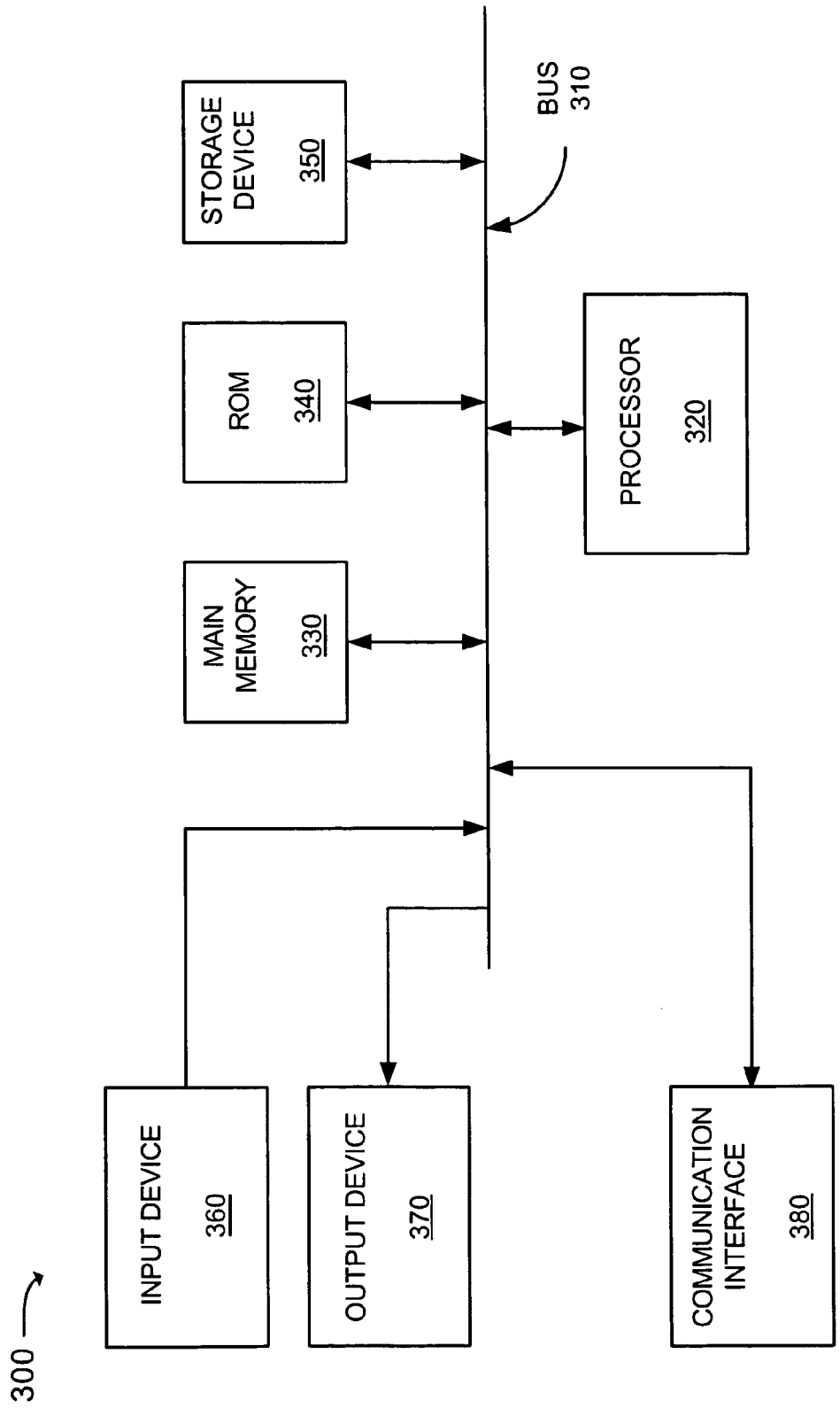
FIG. 3 is an exemplary diagram of a computing device which may represent a client, a content provider, or a publisher.

FIG. 3 is an exemplary diagram of a computing device 300, which may represent client 210, content provider 220, and/or publisher 230. Computing device 300 may include a bus 310, a processor 320, a main memory 330, a read only memory (ROM) 340, a storage device 350, an input device 360, an output device 370, and a communication interface 380. Bus 310 may include a path that permits communication among the components of computing device 300.

Processor 320 may include a conventional processor, microprocessor, or processing logic that interprets and executes instructions. Main memory 330 may include a random access memory (RAM) or another type of dynamic storage device that may store information and instructions for execution by processor 320. ROM 340 may include a conventional ROM device or another type of static storage device that stores static information and instructions for use by processor 320. Storage device 350 may include a magnetic and/or optical recording medium and its corresponding drive.

Input device 360 may include one or more conventional mechanisms that permit a user to input information to computing device 300, such as a keyboard, a mouse, a pen, voice recognition and/or biometric mechanisms, etc. Output device 370 may include one or more conventional mechanisms that output information to the user, including a display, a printer, a speaker, etc. Communication interface 380 may include any transceiver-like mechanism that enables computing device 300 to communicate with other devices and/or systems. For example, communication interface 380 may include mechanisms for communicating with another device or system via a network, such as network 240.

Content management tool 225 may be stored in a computer-readable medium, such as memory 330. A computer-readable medium may be defined as one or more physical or logical memory devices. The software instructions defining content management tool 225 may be read into memory 330 from another computer-readable medium, such as data storage device 350, or from another device via communication interface 380. The software instructions contained in memory 330 may cause processor 320 to perform processes that will be described later. Alternatively, hardwired circuitry or other logic may be used in place of, or in combination with, software instructions to implement processes consistent with the invention. Thus, implementations consistent with the principles of the invention are not limited to any specific combination of hardware circuitry and software. Additionally, multiple computing devices may function together to implement the functionality of content provider 220 and content management tool 225.

Content Management Tool 225

Figure 4:
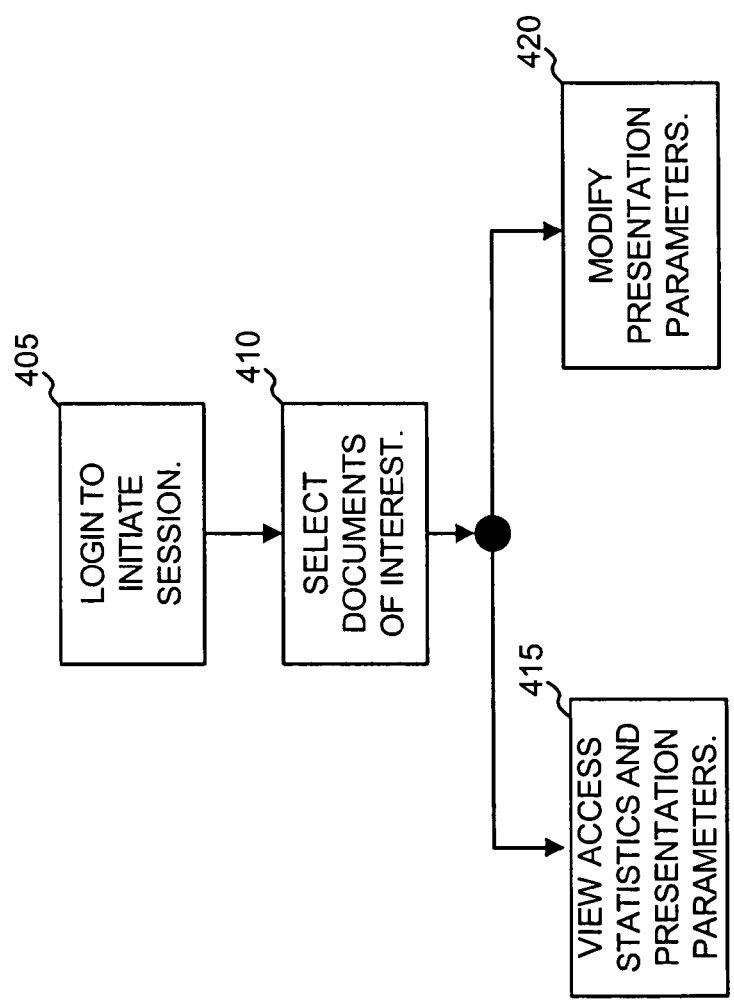
FIG. 4 is a flow chart illustrating exemplary operations of a content management tool.

FIG. 4 is a flow chart illustrating exemplary operations of content management tool 225.

Content management tool 225 may provide a secure password-protected online environment through which a publisher 230 can manage the presentation of its content by content provider 220. Publisher 230 may initiate a session with content management tool 225 by initially logging into the system (act 405). The session may optionally be a secure session that may be authenticated via a password or via other secure authentication techniques.

The publisher may select the documents (content) that are of interest (act 410). In one implementation, content provider may generally provide content relating to documents that are traditionally published as printed works, such as books, magazines, or catalogs. In other implementations, the documents may be other types of works, such as web pages, emails, other electronic documents, etc.

The documents selected in act 410 can be selected in a number of ways. In general, the documents may be selected either individually, such as by ISBN, ISSN, DOI (digital object identifier) number, URL (uniform resource locator), title, etc., or in groups by more general identification information. For example, journal title, publication date, genre (e.g., cookbooks, fiction), author, division (i.e., all books from a certain company division), keyword searching, etc., could be used to identify multiple documents that are under the control of publisher 230. Content management tool 225 may not allow documents that are not under the control of the logged in publisher (e.g., documents that belong to a different publisher) to be selected.

Once the documents of interest are identified, a number of different operations relating to the documents may, at the direction of the logged in publisher, be performed. Access statistics and presentation parameters relating to the selected documents may be viewed (act 415). The access statistics may include, for example, the number of users that have viewed the document, the average number of pages viewed per user, search terms used to access the document, and statistics relating to other links, such as advertisements, that are shown with the document. The presentation parameters may include any parameter that defines presentation restrictions or options that relate to the document. For example, the presentation parameters may define portions of the document that are not to be displayed to users and how advertisements are displayed with the document. Additional examples of presentation parameters are described below. The presentation parameters may be modified by the publisher (act 420). In some implementations, the modified presentation parameters may immediately go into effect and be reflected, in real-time, in the access statistics.

Figure 5:
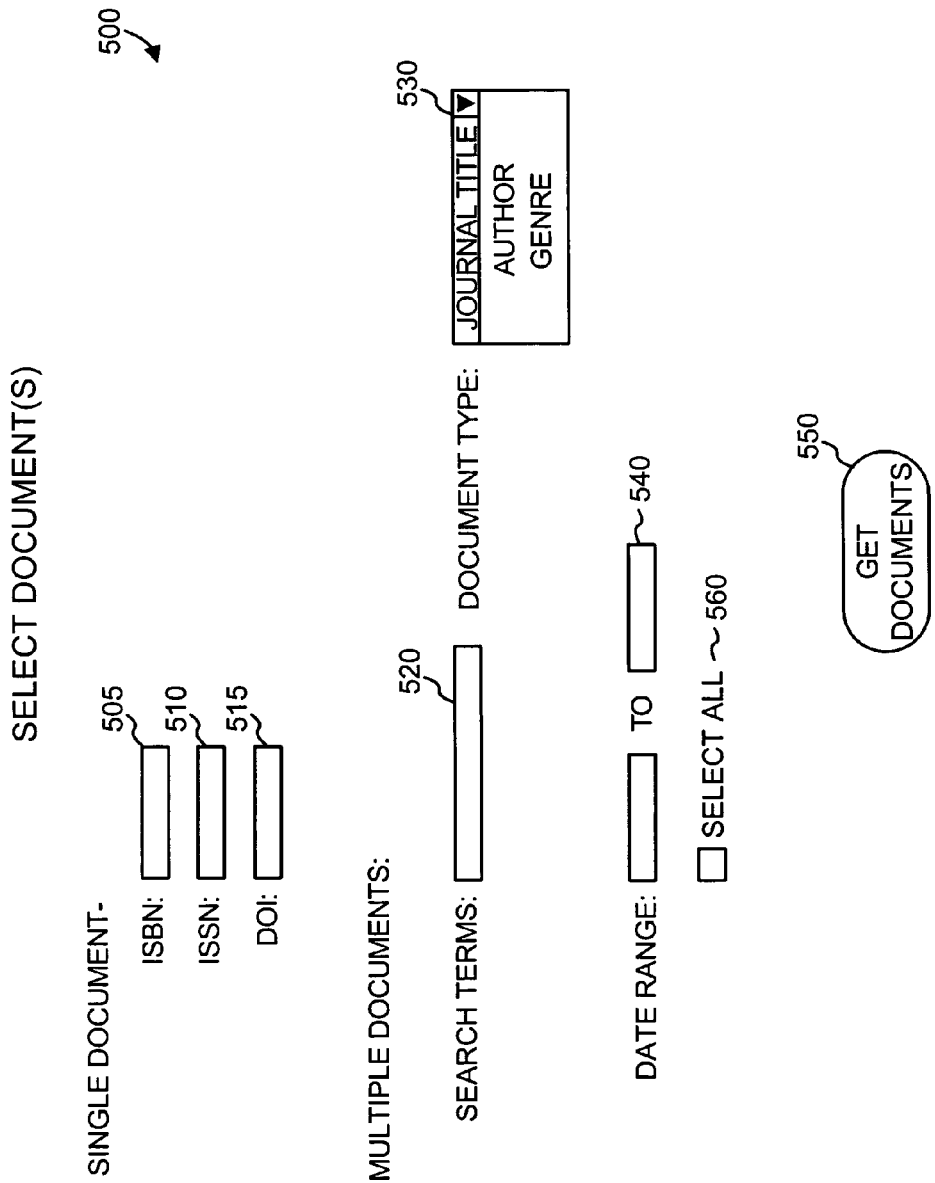
FIG. 5 is a diagram illustrating an exemplary graphical interface through which a publisher may select documents of interest.

FIG. 5 is a diagram illustrating an exemplary graphical interface 500 in which a publisher may select documents of interest (act 410). Single documents may be specified by entering unique document identification information, such as, for a book, an ISBN number in ISBN field 505, an ISSN number in ISSN field 510, or a DOI number in DOI field 515. One of ordinary skill in the art will recognize that other identification information could also be used to identify a document.

In addition to identifying single documents, groups of documents may be identified using search terms. A search term field, such as search term field 520, may be used to enter search terms. The search terms may be further defined by specifying a context of the search terms in corresponding context menu 530. Context menu 530 may be a drop down menu through which the publisher can select various search contexts. For example, the publisher may enter the search term "cook books" in search term field 520 and select the "genre" context. This may cause content management tool 225 to return all of the cook books that are associated with the publisher. As another example, selecting the "author" context may cause content management tool 225 to return all documents in which the author name matches the terms in search term field 520. The selected documents may be further limited by other criteria, such as a date range entered via date range fields 540. A get all field 560 may be provided to enable the publisher to select all of the documents that the publisher controls.

Selecting "get documents" command button 550 may cause content management tool 225 to process the information entered in graphical interface 500 and return a list of documents that satisfy the entered criteria. Graphical interface 500 is exemplary; many different interfaces could be used to select a subset of documents from a corpus of documents.

FIG. 6 is an exemplary graphical interface 600 that displays the selected documents along with information relating to the documents (act 415). In this example, two books, "book1" and "book2" are shown as having been selected, along with informational fields 610-655 relating to each of the books. Book1 and book2 may have been selected using graphical interface 500. Fields 610-655 collectively define the access statistics and presentation parameters of the selected documents. Field 610, percent of work to display, may correspond to the portion (percent) of the work that may be displayed to a particular user. Publishers may desire to limit the portion of a document that is viewable by any particular user. One way to limit access is by putting a limit on the portion of the document that will be shown to a user. Field 615, pages to block, may list pages of the document that will not be shown to the users. A publisher may wish to completely bar some portions of the documents served by content provider 220, regardless of whether the user has reached the percent limit corresponding to field 610. Field 620, images viewable, defines whether images in the document, such as photographs or other graphics, are viewable. When field 620 is set to "no," content management tool 225 may block out, blur, or otherwise obscure the images before transmitting them to a user.

Field 625, advertisements served, may define whether advertisements should be displayed along with the document. Field 630 may include any "special" links that should be displayed with the document. A publisher may, for example, wish to always display a link to a web site that was specifically designed for a document, such as the home page associated with a document or an author. Such links may be shown in field 630. Field 635 may be used to list certain advertisements that are not to be shown (i.e., that are blocked) when the document is displayed. Such advertisements may be defined, for example, by keyword or URL. A publisher of books for children may, for example, wish to block advertisements that include terms that may not be appropriate for young children. Alternatively, if an undesirable advertisements are known to originate from certain URLs, the publisher may block advertisements from these URLs.

Field 640 may list the average number of pages from the document that are requested by the users. Field 645 pertains to micro-purchases of portions of the document. The publisher may, for example, allow users to purchase individual chapters of a book. Field 645 may relate to which portions of the document may be individually purchased as well as to types of payment (e.g., credit card, pre-paid account) that may be accepted when making these purchases.

Field 650 may provide information regarding the number of users that view the document pursuant to a search query. In this situation, content provider 220 may include a search engine through which users may enter search queries. Content provider 220 may provide a list of results to the user that match the search query. The users that select a document from the list of search results may be tracked by content provider 220 and provided to the publishers via parameter 650.

Field 655 may include statistics relating to advertisements displayed alongside with (e.g., on the same web page as) the documents. These statistics may generally summarize the effectiveness of advertisements displayed with the document. For example, statistics, such as total number of clicks, click-through-rate (CTR), and revenue derived from the advertisements may be displayed. One particular type of advertisement that may be shown to users is a link to "buy the book." The link may take the user directly to a web page that allows the user to purchase a physical or electronic copy of the book. Statistics relating to buy-the-book links may also be displayed, such as the aggregate number of clicks on such links.

Graphical interface 600 may additionally allow the publisher to select one or more of the displayed documents. Check boxes 660 may allow the publisher to select the documents. The parameters relating to the selected documents may then be modified. There may additionally be a graphical element that selects all of check boxes 660. As shown in FIG. 6, graphical command button 670 may be selected to take the publisher to a screen to modify parameters 610-655 (act 420). Alternatively, the publisher may be permitted to modify parameters 610-655 via graphical interface 600.

One of ordinary skill in the art will recognize that the information relating to a particular document, as given in fields 610-655, is exemplary. Some or all of the information corresponding to fields 610-655 may be tracked and displayed to the publishers. Other information not discussed above may also be tracked and displayed to the publishers. For example, access rights for the documents may be customized for different users or classes or users. For example, a document may be blocked from being shown to certain users, such as users from a certain IP address or users defined by other parameters. Such access rights may be edited by the publisher on a book-by-book basis. A publisher may define, for instance, that users that reside in the United Kingdom are only allowed to view a certain set of books, or that users from an IP address associated with a university may access the entire book while other users are restricted to viewing a portion of a book. Further, the disclosed manner in which the information relating to a document is displayed to a publisher is also exemplary. Many different graphical interfaces may be used to effectively present this information to the user.

Figures 7A, 7B:
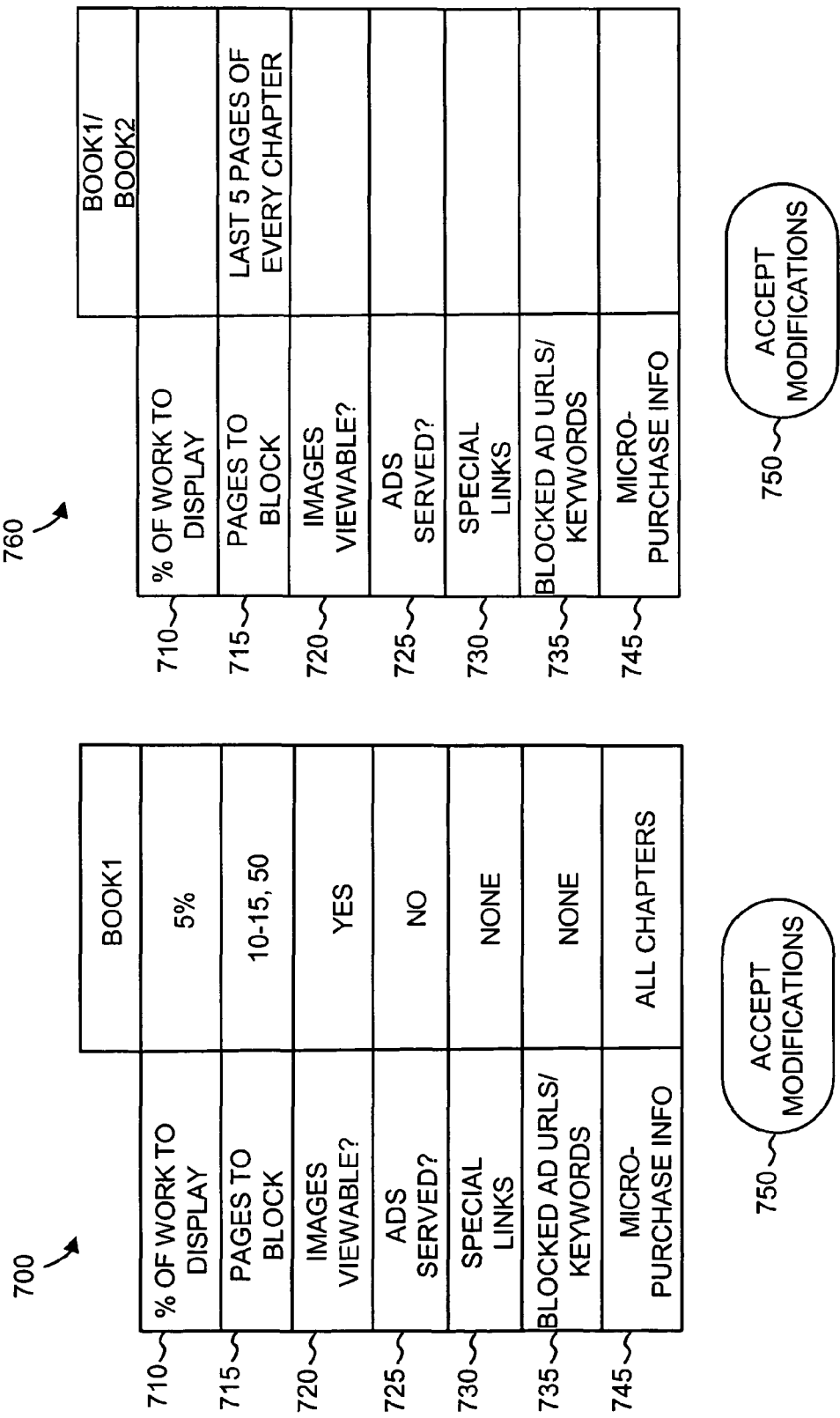
FIG. 7A is an exemplary graphical interface through which a publisher may modify parameters relating to a document.
FIG. 7B is an exemplary graphical interface through which a publisher may modify access parameters for a group of documents.

FIG. 7A is an exemplary graphical interface 700 through which a publisher may modify certain ones of parameters 610-655. Assume that the publisher accessed interface 700 by selecting check box 660 for book1 (FIG. 6) and clicking command button 670. As shown in FIG. 7A, the selected document, book1, is available for modifying.

Graphical interface 700 may provide a number of fields through which the publishers can modify access parameters. In particular, as shown, the parameter of field 610, the percent of the work to display, may be modified to a value between zero and one-hundred percent in field 710. The parameters corresponding to fields 615, 620, 625, 630, 635, and 645, may similarly be modified in fields 715, 720, 725, 730, 735, and 745, respectively. Specifically, in field 715, the publisher may edit the pages that are to be blocked from the user; in field 720, the publisher may change whether photographs and graphics from the document are to be blocked; in field 725, the publisher may change whether advertisements are to be shown with the document; in field 730, the publisher may edit the special links shown with the document; in field 735, the publisher may edit the list of blocked advertisement URLs or keywords; and in field 745, the publisher may edit the micropurchase information associated with the document. Graphical command button 750 may be selected to enter the modifications (if any). In the example of FIG. 7A, field 710 was edited from 10% to 5%.

FIG. 7B is an exemplary graphical interface 760 through which a publisher may modify the access parameters for a group of documents. Graphical interface 760 is similar to graphical interface 700, except that assume, instead of selecting a single document (book1), the publisher selected check boxes 660 for both book1 and book2. Interface 760 may allow the publisher to modify the parameters for both documents simultaneously. In other words, through an interface such as interface 760, content management tool 225 allows for bulk selection and editing of documents. A publisher may, for instance, select all cookbooks and block the last five pages of every chapter from viewing.

In some implementations, the publisher may also be able to associate time periods with one or more of the presentation parameters. For instance, a publisher may wish to turn advertisements on for cookbooks for a week to determine the effect of advertising. At the end of the week, the advertisements may be automatically turned off.

One of ordinary skill in the art will recognize that the graphical interfaces shown in FIGS. 5-7 are exemplary only. Other graphical designs/layouts could be used to interface with the user. In other implementations, the publisher may interact with content management tool 225 using non-graphical interfaces, such as by uploading a spreadsheet file or other files.

Figure 8A:
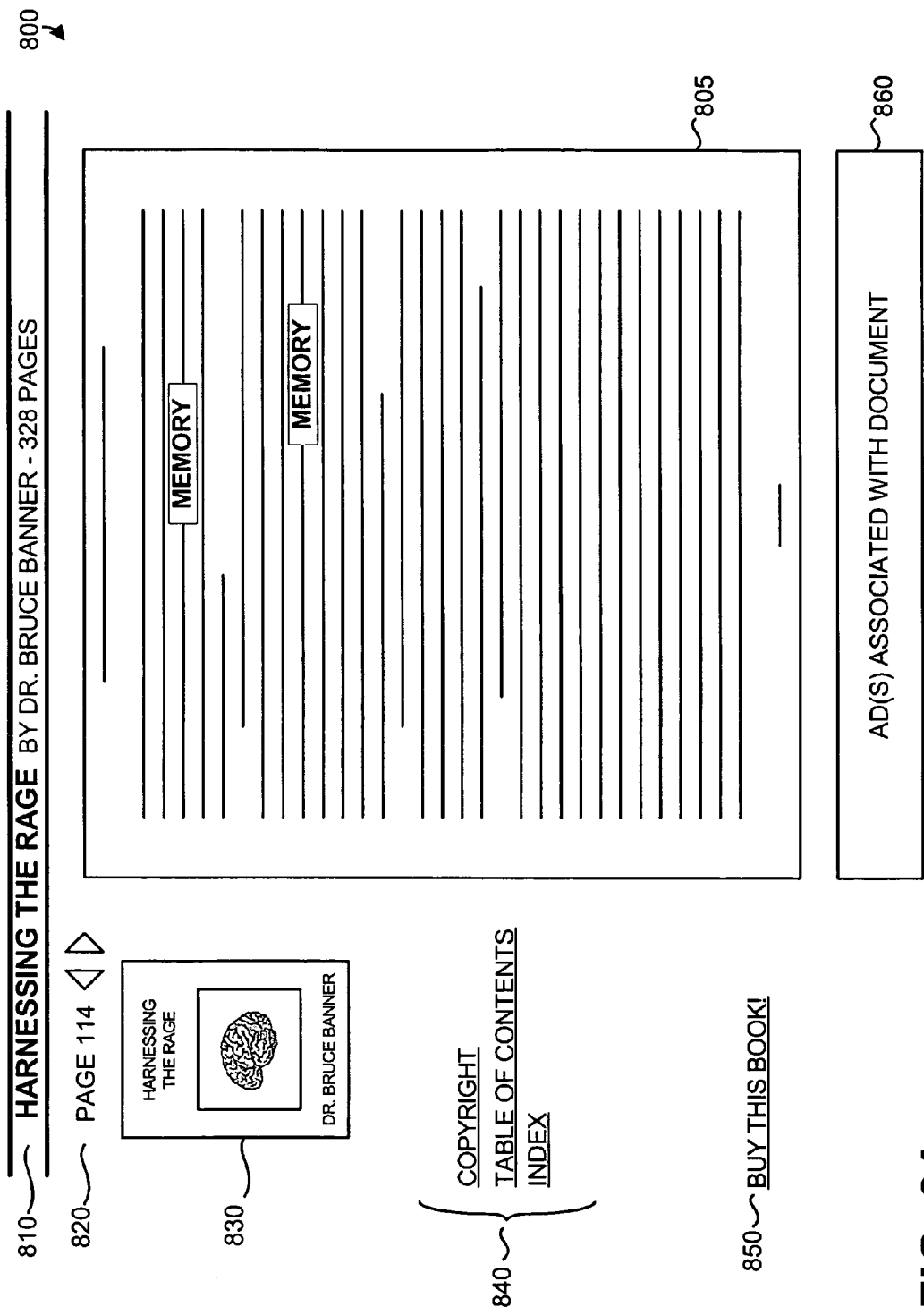
FIGS. 8A and 8B are exemplary diagrams illustrating documents presented by a content provider to a user.
Figure 8B:
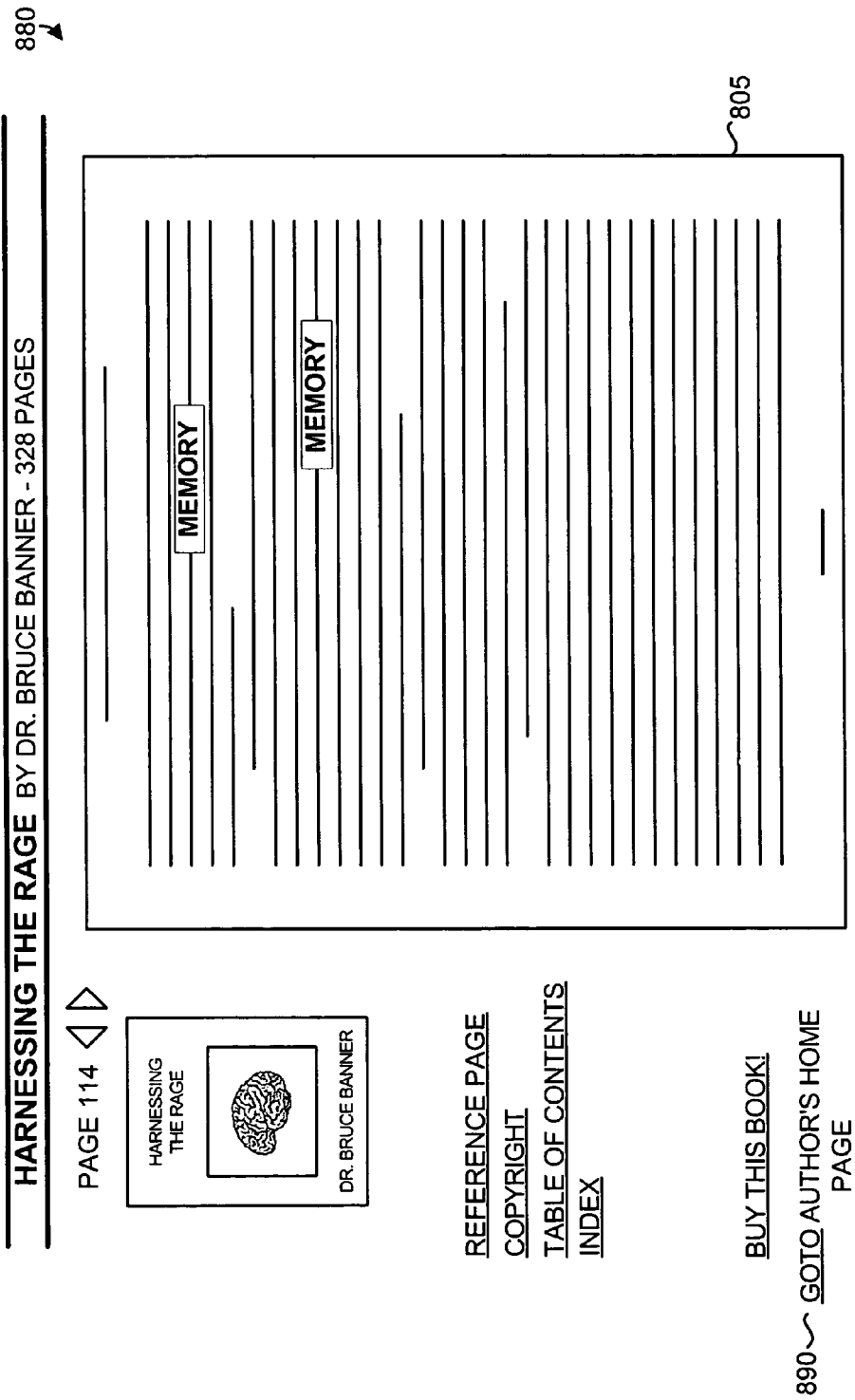

FIGS. 8A and 8B are exemplary diagrams illustrating documents presented by content provider 220 to a user. Assume that the user has navigated to the book "Harnessing the Rage." For instance, the user may have entered a search query that includes the term "memory." In response, content provider 220 may have provided a list of documents, including "Harnessing the Rage." The user may then have selected page 114 of this book to view in more detail.

Document presentation page 800 may be a web page that includes page 805 of the selected book. Certain terms on page 805, such as the terms that are in the search query entered by the user, may be highlighted in page 805 (e.g., "memory"). The text on page 805, although illustrated as an abstract representation of the text in FIG. 8A, may actually be shown to the user at a resolution at which the user can comfortably read the text. Page 805 may be an image of the corresponding page (i.e., page 114) of the actual book.

Other information, in addition to the actual page of the book (page 805) may also be shown in document presentation page 800. For example, in FIG. 8A, document header information 810, page navigation elements 820, an image 830 of the cover of the document, section navigation elements 840, "buy the book" link 850, and advertisement(s) 860 are also displayed in document presentation page 800.

Page navigation elements 820 may allow the user to navigate to the next page or the previous page of the document. Selecting the previous or next page may cause content provider to display another document presentation page as long as the additional page is still within the allowed access rights of the document (e.g., the total number of pages shown to the user is below the allowed viewable percent of the document and the new page is not a blocked page). Image 830 of the cover of the document may display a thumbnail image of the book cover. Clicking on image 830 may take the user to a full page view of the cover. Section navigation elements 840 may include a number of links that take the user directly to predetermined sections of the book. "Buy the Book" link 850 may take the user to a page that gives the user the option of purchasing the book. For example, Buy the Book link 850 may take the user to a third-party online book retailer from which the user can purchase the book. Advertisement(s) 860 may include a set of advertisements for a product or service. The advertisement may be chosen for relevance to the subject matter of the document being viewed or the search query used to access the document.

FIG. 8B is another exemplary diagram illustrating a document presented by content provider 220 to a user as document presentation page 880. This example is similar to that shown in FIG. 8A. Assume that in this example, however, the publisher modified the access parameters for the document such that advertisements served field 725 was changed to "no" and special links field 730 was changed to include a link to the home page of the author. Document presentation page 880 may now additionally include link 890 to the home page of the author. Also, advertisement 860 is not shown in document presentation page 880.

Exemplary Implementation

Figure 9:
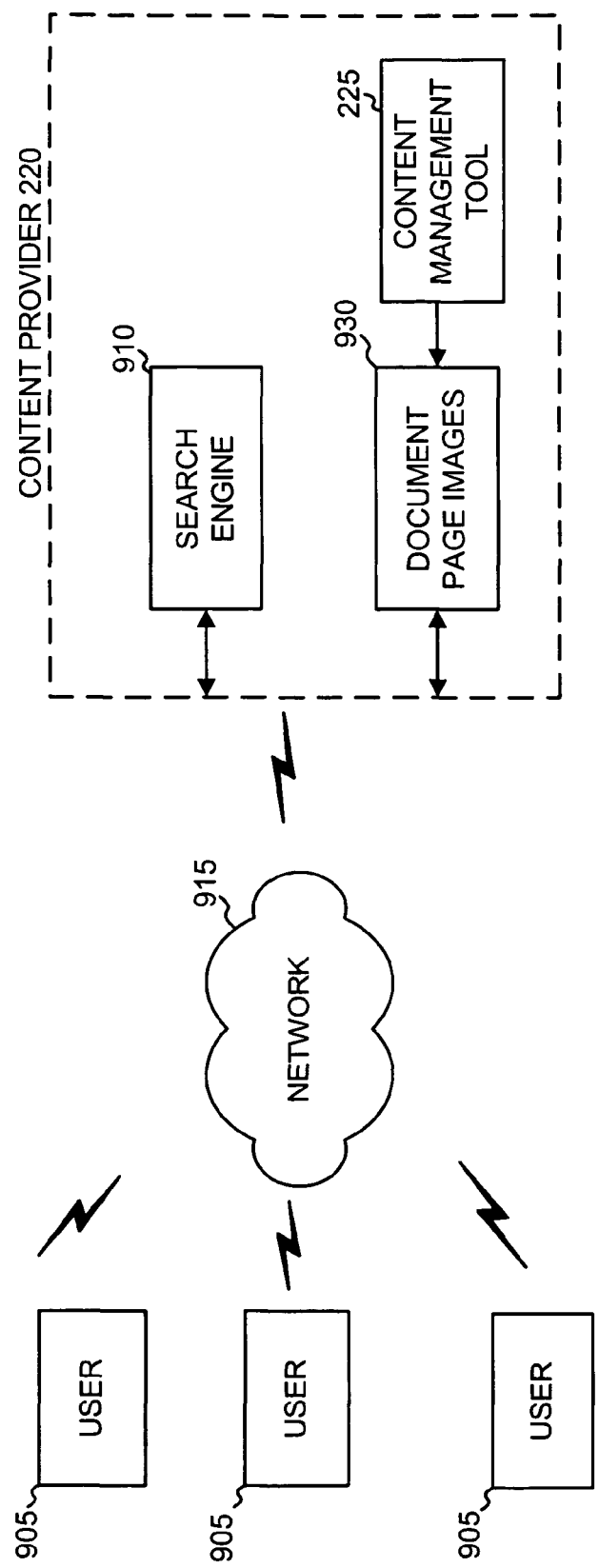
FIG. 9 is a diagram illustrating an exemplary implementation of a content provider and the content management tool in the context of a printed-material search engine.

FIG. 9 is a diagram illustrating an exemplary implementation of content provider 220 and content management tool 225 in the context of a printed-material search engine. A number of users of clients 905 may connect to a search engine 910 over a network 915, such as the Internet. Search engine 910 may be a search engine that returns links to a ranked set of documents that are related to a user query. Search engine 910 may be a specialized search engine that searches a database corresponding to a number of books. The books may have been digitized by scanning each page and performing OCR to generate computer-readable text in the books. Alternatively, the books may be obtained in a digital form direct from the publisher, author, or another source.

The user may select a document for viewing. In response, content provider 220 may transmit images of one or more pages of the selected document from a database 930 of documents. The transmitted images of the pages may be sent to the user as a web page and may include additional material, such as advertisements and other links, as shown in FIGS. 8A and 8B. The transmitted images may be assembled to reflect the access parameters as defined for the document by publisher 230, such as access parameters defined using content manager tool 225. As previously mentioned, the publisher may access statistics relating to their documents and modify access parameters via content management tool 225. The modifications to the access parameters may be immediately reflected in the results returned to the users.

Although content management tool 225 was primarily described as a tool through which the publishers directly interact over a network, in other implementations, content management tool 225 may be an internal tool of content provider 220. Publishers may modify the access parameters for their documents by talking to a representative of content provider 220.

CONCLUSION

Content, such as books and other documents that are traditionally published as printed works, may be made available online. The owners of such documents may individually customize how their document is to be presented to users. In particular, access rights and other display parameters may be individually modified by the owners. By providing document owners such custom control over their content, the document owners may be more willing to make their works available online.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the invention is not limiting of the invention. Thus, the operation and behavior of the aspects were described without reference to the specific software code—it being understood that a person of ordinary skill in the art would be able to design software and control hardware to implement the aspects based on the description herein. Some of the features identified as being performed by the content provider may be performed by the client or by the publisher.

The foregoing description of preferred embodiments of the invention provides illustration and description, but is not intended to be exhaustive or to limit the invention to the precise form disclosed. Modifications and variations are possible in light of the above teachings or may be acquired from practice of the invention. For example, although many of the operations described above were described in a particular order, many of the operations are amenable to being performed simultaneously or in different orders to still achieve the same or equivalent results.

No element, act, or instruction used in the present application should be construed as critical or essential to the invention unless explicitly described as such. Also, as used herein, the article "a" is intended to potentially allow for one or more items. Further, the phrase "based on" is intended to mean "based, at least in part, on" unless explicitly stated otherwise.

What is claimed is:

1. A method performed by one or more server devices, the method comprising:
providing, to an entity, a first interface that includes information identifying each of a plurality of documents, the information including:
access statistics, for each document of the plurality of documents, that relate to previous accesses of the document by one or more users, where the access statistics include an indication of an average number of different pages per document, of the plurality of documents, accessed per user, of the one or more users, and
fields that define presentation parameters applied to each of the plurality of documents,
where the presentation parameters, applied to a first document of the plurality of documents, are different than the presentation parameters applied to a second document of the plurality of documents,
where the fields, for one of the plurality of documents, include:
a field that allows the entity to define a quantity of content, of the one of the plurality of one or more documents, that is to be presented to a user when the user accesses the one of the plurality of documents, where the quantity is greater than zero and less than a full content of the particular document one of the plurality of documents,
a field that allows the entity to list one or more particular advertisements, of a plurality of advertisements, that are to be blocked when presenting the one of the plurality of documents to the user, and least one of:
a field that allows the entity to define one or more portions of the one of the plurality of documents to be provided to the user for purchase, where the one or more portions of one of the plurality of documents to be provided to the user for purchase are less than the full content of the one of the plurality of documents, or
a field that allows the entity to define whether images, included in the one of the plurality of documents, are to be viewable to the user when presenting the one of the plurality of documents to the user,
the providing being performed by one or more processors associated with the one or more server devices;

presenting, using one or more processors associated with the one or more server devices, a second interface based on selection, by the entity, of one or more of the plurality of documents, where the second interface includes information identifying the one or more of the plurality of documents, the information identifying the one or more of the plurality of documents including the presentation parameters, associated with the fields, corresponding to the one or more of the plurality of documents;

receiving, from the entity and via the second interface, modifications to the presentation parameters, associated with the fields, corresponding to the one or more of the plurality of documents, the receiving being performed by one or more processors associated with the one or more server devices; and applying, using one or more processors associated with the one or more server devices, the modified presentation parameters, the modified presentation parameters to the one or more of the plurality of documents.

2. The method of claim 1, where the first interface and the second interface include a graphical user interface presented to the entity, and where the entity is located at a remote location with respect to the one or more server devices.

3. The method of claim 1, where the fields further include a field that allows the entity to define a maximum portion of the one of the plurality of documents to present to the user, where the maximum portion includes less than all of the one of the plurality of documents, and where the maximum portion corresponds to a particular portion of the one of the plurality of documents, the method further comprising:

receiving, from the entity, via the second interface, modification of the field, that allows the entity to define the maximum portion for the one of the plurality of documents, to another particular portion of the one of the plurality of documents.

4. The method of claim 1, where the fields further include a field that includes a parameter defining whether advertisements are to be presented when the one of plurality of documents are presented to the user.

5. The method of claim 1, where the one or more particular advertisements, that are to be blocked when presenting the one of the plurality of documents, are identified based on one or more keywords, associated with the one or more particular advertisements, or one or more uniform resource locators (URLs), associated with the one or more particular advertisements.

6. The method of claim 1, where the access statistics include statistics relating to advertisements associated with the plurality of documents.

7. The method of claim 1, where the plurality of documents include documents that are presented to one or more users as images of pages of printed documents.

8. The method of claim 1, where the presentation parameters relate to access limitations applied to the plurality of one or more documents when the plurality of one or more documents are accessed by the one or more users.

9. The method of claim 1, where the entity includes an author or a publisher of the plurality of documents.

10. The method of claim 1, further comprising:

receiving search terms related to the plurality of documents; and selecting the plurality of documents based on the search terms, where the information identifying each of a plurality of documents is provided after the plurality of documents are selected based on the search terms.

11. The method of claim 1, where the modifications to the presentation parameters are received as a set of presentation parameters that apply to two or more the plurality of documents.

12. The method of claim 1, where the presentation parameters are applied to a particular group of users.

13. The method of claim 1, where the presentation parameters relate to geographical-based access limitations.

14. One or more non-transitory memory devices including processing instructions executable by one or more processors, the processing instructions comprising:

one or more instructions to receive selection of a plurality documents, comprising images of pages of printed works, from a publisher that owns rights to the printed works;

one or more instructions to present, to the publisher and via a first interface, information identifying each of the plurality of documents, the information including:

access statistics, for each document of the plurality of documents, that relate to previous accesses of the document by at least one user, where the access statistics include an indication of an average number of different pages per document, of the plurality of documents, accessed per user of the at least one user, and fields that define presentation parameters, applied to each of the plurality of documents, that relate to how the plurality of documents are to be presented to users when the users access the plurality of documents, where the presentation parameters, applied to a first group of the plurality of documents, are different than the presentation parameters applied to a second group of the plurality of documents, the fields, for one of the plurality of documents, including:

a field that allows the publisher to list particular pages, of the one of the plurality of documents, that are to not be presented to the users, a field that allows the publisher to define whether images, included in the one of the plurality of documents, are to be viewable when presenting the one of the plurality of documents to the users, and at least one of:

a field that allows the publisher to list one or more particular advertisements, of a plurality of advertisements, that are to be blocked when presenting the one of the plurality of documents to the users, or a field that allows the publisher to define one or more particular portions, of the one of the plurality of documents, to be provided to the users for purchase, where the one or more particular portions, of the one of the plurality of documents to be provided to the users for purchase, are less than the full content of the one of the plurality of documents;

one or more instructions to provide a second interface based on selection, by the publisher, of the one of the plurality of documents, where the second interface includes information identifying the one of the plurality of documents, the information identifying the one of the plurality of documents including the presentation parameters, associated with the fields, for the one of the plurality of documents;

one or more instructions to receive, from the publisher and via the second interface, modifications to one or more of the presentation parameters, associated with the fields, for the one of the plurality of documents; and one or more instructions to apply the modified one or more presentation parameters to the one of the plurality of documents.

15. A device comprising:
a physical memory device to store instructions; and
a processor device, coupled to the memory device, to receive and to execute the instructions to:
   select a plurality of documents based on at least one of a unique document identifier or information identifying a document as belonging to a particular group of documents;
   present, to an entity that has authority to modify access rights associated with the plurality of documents, a first interface that includes information identifying each of the plurality of documents, the information including:
   access statistics, for each document of the plurality of documents, that relate to previous accesses of the document by at least one user, where the access statistics include an indication of an average number of different pages per document, of the plurality of documents, accessed per user of the at least one user, and
   fields defining presentation parameters applied to each of the plurality of documents, where the presentation parameters define how the plurality of documents are to be presented to users when the users access the plurality of documents,
   where the presentation parameters, applied to a first document of the plurality of documents, are different than the presentation parameters applied to a second document of the plurality of documents, the fields, for one of the plurality of documents, including:
      a field that allows the entity to define a quantity of content of the one of the plurality of documents that is to be presented to the users, where the quantity is greater than zero and less than a full content of the one of the plurality of documents,
      a field that allows the entity to list one or more particular advertisements, of a plurality of advertisements, that are to be blocked when the one of the plurality of documents is presented to the users, and
      a field that allows the entity to define whether images, included in the one of the plurality of documents, are to be viewable when presenting the one of the plurality of documents to the users;
   provide a second interface based on selection of one or more of the plurality of documents,
   where the second interface includes information identifying the one or more of the plurality of documents, the information identifying the one or more of the plurality of documents including the presentation parameters, associated with the fields, corresponding to the one or more of the plurality of documents;
   receive modifications to the presentation parameters corresponding to the one or more of the plurality of documents, from the entity, via the second interface; and
   apply the modified presentation parameters to future accesses of the one or more of the plurality of one or more documents.

16. A method performed by a computer system, the method comprising:
   presenting, via a first interface associated with the computer system, information identifying each of a plurality of documents, selected by a publisher of the plurality of documents, as selected documents, the information including:
      access statistics for one or more of the selected document that relate to previous accesses of the one or more selected document by users, where the access statistics include an indication of an average number of different pages for a particular document, of the one more of the select documents, accessed per user, and
      fields that define presentation parameters, applied to each of the selected documents, that relate to how the selected documents are to be presented shown to users when accessing the selected documents,
      where the presentation parameters, applied to a first document of the selected documents, are different than the presentation parameters applied to a second document of the selected documents,
      where the fields, for one of the selected documents, include:
         a field that allows the publisher to define one or more portions, of the one of the selected documents, that are to be provided to the users for purchase, where the one or more portions, of the one of the selected documents to be provided to the users for purchase, are less than the full content of the one of the selected documents,
         a field that allows the publisher to define whether images, included in the one of the selected documents, are to be viewable to the users when presenting the one of the selected documents to the users, and least one of:
         a field that allows the publisher to define a maximum portion of the one of the selected documents to present to the users, where the maximum portion is less than an entirety of the one of the selected documents, or
         a field that allows the publisher to list one or more particular advertisements, of a plurality of advertisements, that are to be blocked when presenting the one of the selected documents to the users;
   providing a second interface based on selection of one or more documents of the selected documents,
   where the second interface includes information identifying the one or more documents, the information identifying the one or more documents including the presentation parameters, associated with the fields and corresponding to the one or more documents;
   receiving, via the second interface, modifications to the presentation parameters, associated with the fields and corresponding to the one or more documents, from the publisher;
   applying, by a processor associated with the computer system, the modified presentation parameters to the one or more documents; and
   providing, by a processor associated with the computer system and according to the modified presentation parameters, at least one document, of the one or more documents, to a user.

17. The method of claim 16,
where the access statistics include a number of hits from search queries for the one or more of the selected documents.

18. The method of claim 16,
where the information identifying each of the selected documents further includes advertising statistics for each of the selected documents.

19. The method of claim 1, where the fields further include a field that allows the entity to define particular pages, of a particular section of at least one of the plurality of documents, to block when presenting the at least one of the plurality of documents to at least one user.

20. The one or more memory devices of claim 14, where the presentation parameters include information relating to purchasing the one or more particular portions of the one of the plurality of documents, and where the information relating to purchasing the one or more particular portions comprises one or more types of payment that are accepted when purchasing the one or more particular portions.

21. The one or more memory devices of claim 14, where the fields further include a field that allows the publisher to define a particular percentage of pages, of the one of the plurality of documents, that are to be presented to the users.

22. The device of claim 15, where the access statistics further include information identifying a number of users that access a document pursuant to a search query.

23. The device of claim 15, where the one or more particular advertisements are defined based on a keyword or a uniform resource locator (URL).

24. The device of claim 15, where the field that allows the entity to define whether the images are viewable causes the images to be blocked out, blurred, or obscured prior to presenting the one of the plurality of documents to the users.

25. The method of claim 16, where the fields further include a field that allows the publisher to define one or more advertisements that are to be presented when the one of the selected documents is presented to the users, the field, that allows the publisher to define one or more advertisements that are to be presented, being associated with a time period defined by the publisher, and where, after expiration of the time period, the one or more advertisements are automatically not presented when the one of the selected documents is presented to the users.

26. The device of claim 15, where the fields further include:

a field that allows the entity to define one or more portions, of the one of the plurality of documents, to be provided to the users for purchase, where the one or more portions are less than the full content of the one of the plurality of documents.

* * * * *